(12) United States Patent
Kim

(10) Patent No.: US 6,288,520 B1
(45) Date of Patent: Sep. 11, 2001

(54) APPARATUS AND METHOD FOR COMPENSATING LEAKAGE CURRENT AND BATTERY SELF DISCHARGE OF A SYSTEM

(75) Inventor: Hyeung-Seog Kim, Suwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/654,166

(22) Filed: Sep. 1, 2000

(30) Foreign Application Priority Data

Sep. 3, 1999 (KR) .................................................. 99/37486

(51) Int. Cl.[7] .................................................. H02J 7/04
(52) U.S. Cl. ............................................. 320/112; 320/149
(58) Field of Search ..................................... 320/112, 149

(56) References Cited

U.S. PATENT DOCUMENTS 5,617,008 * 4/1997 Eastmond et al. ................... 320/149
5,767,659 * 6/1998 Farley ................................... 320/106
5,955,869 * 9/1999 Rathman .............................. 320/132

* cited by examiner

Primary Examiner—Peter S. Wong
Assistant Examiner—Gregory J. Toatley, Jr.
(74) Attorney, Agent, or Firm—Fleshner & Kim, LLP

(57) ABSTRACT

The present invention is capable of displaying remaining electric current of a battery by compensating leakage current of a system and self-discharge current of the battery by using a system leakage current timer for compensating leakage current of the system, self-discharge timer of the battery for compensating self-discharge current of the battery. Hence, a user can properly manage remaining current of the battery because an accurate remaining current of the battery is displayed.

18 Claims, 5 Drawing Sheets

APPARATUS AND METHOD FOR COMPENSATING LEAKAGE CURRENT AND BATTERY SELF DISCHARGE OF A SYSTEM

BACKGROUND OF THE INVENTION

1. Field of the Invention

The present invention relates to an apparatus and a method for compensating leakage current and battery self-discharge, and more particularly, a system having such an apparatus and method.

2. Background of the Related Art

FIG. 1A illustrates a system, e.g., notebook computer, 50-1 having a recess for receiving a battery pack 40 and input 20 for receiving the voltage from an AC adapter. FIG. 1B illustrates a circuit diagram for detecting the remaining electric current of a battery. The battery pack 40 includes a battery 2, a resistor R and an electric current counter 1. When the battery is charged or discharged, an electric current flows to the resistor R and the current counter 1 measures the electric voltage generated in proportion to the electric current flowing through the resistor R. The output of the counter 1 is inputted to a micro-controller to detect the remaining electric current of the battery 2 by using the measured electric voltage.

However, such a circuit has various disadvantages. For example, the notebook uses a minute mA of electricity as stand-by electricity for operation of a control circuit when the system is turned OFF, resulting in a leakage current. The circuit can detect remaining electric current in the range of 10 mA. However, the minute mA of the stand-by electricity is too small to detect. For example, when a system is off after installing a charged battery on the system, the capacity of the battery decreases in accordance with the passage of time due to leakage current of the system. Further, the circuit cannot detect the self-leakage of the battery over time, whether the battery is connected or installed to the system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to compensate for leakage current.

It is another object of the present invention to compensate for self discharge.

It is a further object of the present invention to accurate manage the remaining battery power.

It is an object of the present invention to provide a method for compensating leakage current of a system which is capable of managing remaining capacity of a battery by compensating leakage current of the system and the self-discharge of the battery connected to the system and displaying the remaining electric current of the battery on a gauge circuit.

To achieve the object, the method for compensating leakage current of the system of the present invention comprises judging process which judges the charge/discharge state of the battery and whether the battery is connected to the system, setting process which adds self-discharge of the battery to the leakage electric current of the system and sets the added values when the battery is connected to the system and the system is OFF, and compensating process which compensates the set self-discharge of the battery and the leakage electric current of the system by using a timer.

The present invention can be also achieved in a whole or in parts by a method for compensating leakage current of a system, comprising judging whether a battery is charged/discharged and the battery is connected to a system; setting leakage current of the system after adding leakage current of the system when the battery is connected to the system and the system is off; and compensating the added setting leakage current of the system by using a timer. The judging process includes the steps of: (a) detecting generation of interrupt which compensates leakage current of the system; (b) detecting state conversion of a current count which counts current used inside of the system when interrupt is not generated; and (c) setting self-discharge current of the battery when the battery is converted into discharge state. The judging process also includes the step of setting state for making setting leakage current of the system and self-discharge current of the battery not be generated when the battery is converted into charge state in the state conversion of the current count.

The setting process includes the steps of: (a) judging whether the battery is separated from the system in order to decide compensation value of self-discharge current of the battery; (b) judging whether leakage current of the system is detected when the battery is connected to the system; and (c) setting self-discharge current of the battery when the battery is separated from the system.

The compensating process includes the steps of: (a) judging whether the added self-discharge current is set when the interrupt occurs; (b) compensating self-discharge current of the battery by using the timer when value of the self-discharge current is set in the judging step; and (c) compensating the setting leakage current of the system by using the timer when the added leakage current of the system is set in the judging step.

The judging process may also includes the step of: setting self-discharge current of the battery when the battery is converted into discharge state, the battery is separated from the system, and leakage current of the system is not detected.

The present invention can be also achieved in a whole or in parts by a method for compensating leakage current of a system, comprising: judging whether a battery is charge/discharge state and is connected to the system; judging whether the battery is separated from the system in order to decide compensation value of self-discharge current of the battery; judging whether leakage current of the system is detected when the battery is connected to the system; setting self-discharge current of the battery and leakage current of the system after adding them separately when the battery is connected to the system and the system is off; compensating the setting self-discharge current of the battery by using a timer when self-discharge current is set in the setting process; and compensating the setting leakage current of the system by using the timer when leakage current of the system is set in the setting process.

The setting process includes the step of: setting self-discharge current of the battery when the battery is separated from the system. The judging process for judging whether the battery is connected to the system includes the steps of: (a) detecting interrupt which compensates self-discharge current of the battery and leakage current of the system; (b) detecting state conversion of the current count which counts current used inside of the system when the interrupt is not detected in the detecting step; and (c) setting self-discharge current of the battery when the battery is converted into discharge state in the state conversion of the current count.

The method for compensating leakage current of the system includes the step of setting self-discharge current of the battery when the battery is converted into discharge state, the battery is separated from the system, and leakage current of the system is not detected. The setting process includes the step of: setting state for making self-discharge current of the battery and leakage current of the system not be generated when the battery is converted into charge state.

The present invention can be achieved in a whole or in parts by an apparatus comprising: a battery pack for providing a power source; and a system for performing a prescribed function and operation to achieve a prescribed result, the system having a device that outputs one of a first voltage when the battery pack is coupled to the system and an external power source is not coupled to the system, a second voltage when the battery pack is not coupled to the system and the external power source is not coupled to the system, and a third voltage when the external power source is coupled to the system, wherein said battery pack includes a micro-controller detecting the first, second and third voltage levels to determine such conditions.

The present invention can be achieved in a whole or in parts a system for performing a prescribed function and operation to achieve a prescribed result, the system having a device, which includes: a resistor coupled for receiving a stand-by voltage; a transistor coupled to the resistor for receiving an output of an adapter; and a diode coupled to the transistor in parallel, wherein a voltage at a node connection between the transistor and resistor is indicative of at least one of application of stand-by voltage and output of the adapter.

The present invention can be achieved in a whole or in parts by a battery pack comprising: a battery; a micro-computer for compensating for leakage current and self-discharge of the battery; and a current counter that indicates discharge or charge of the battery.

The present invention can be achieved in a whole or in parts by a method for operating a battery pack having a battery for coupling to a system, comprising: detecting a change in the charge of the battery; determining a self-discharge of the battery; determining a leakage current of the battery; and compensating for at least one the change in the charge of the battery, self-discharge of the battery, and the leakage current.

The present invention can be achieved in a whole or in parts by a system for performing a prescribed function and operation to achieve a prescribed result, the system having a device, which includes: a first resistor coupled for receiving an output of an adapter; and a second resistor coupled to the first resister in series, wherein a voltage of a serial connection node is indicative of a connection to the adapter.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1A:
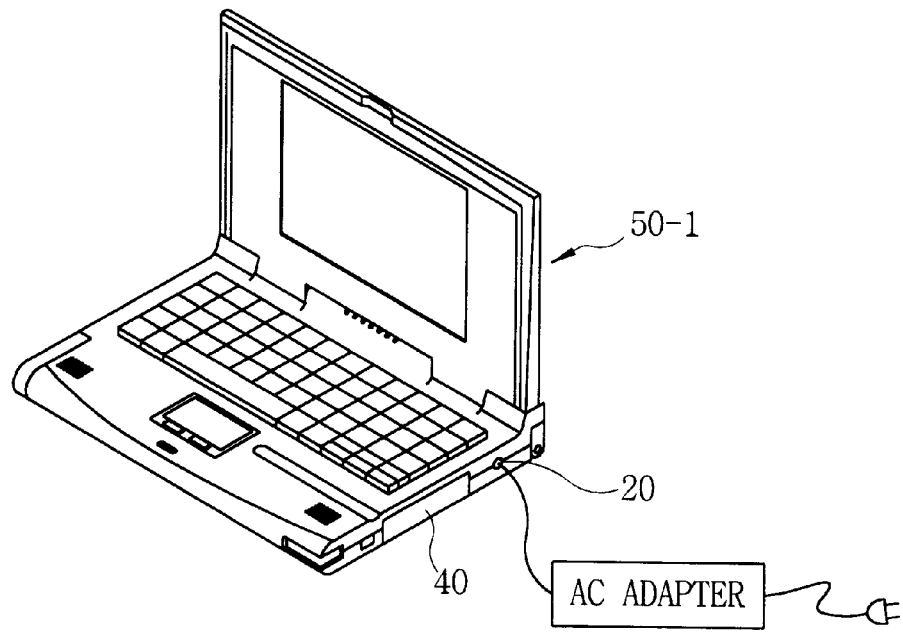
FIG. 1A illustrates a notebook computer.
Figure 1B:
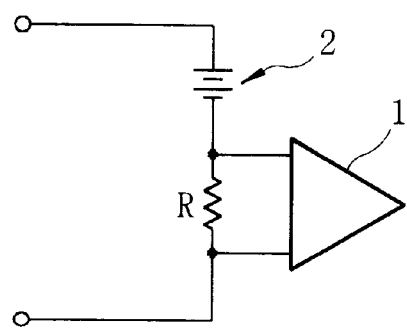
FIG. 1B illustrates a circuit diagram for detecting the remaining electric current of a battery.
Figure 2A:
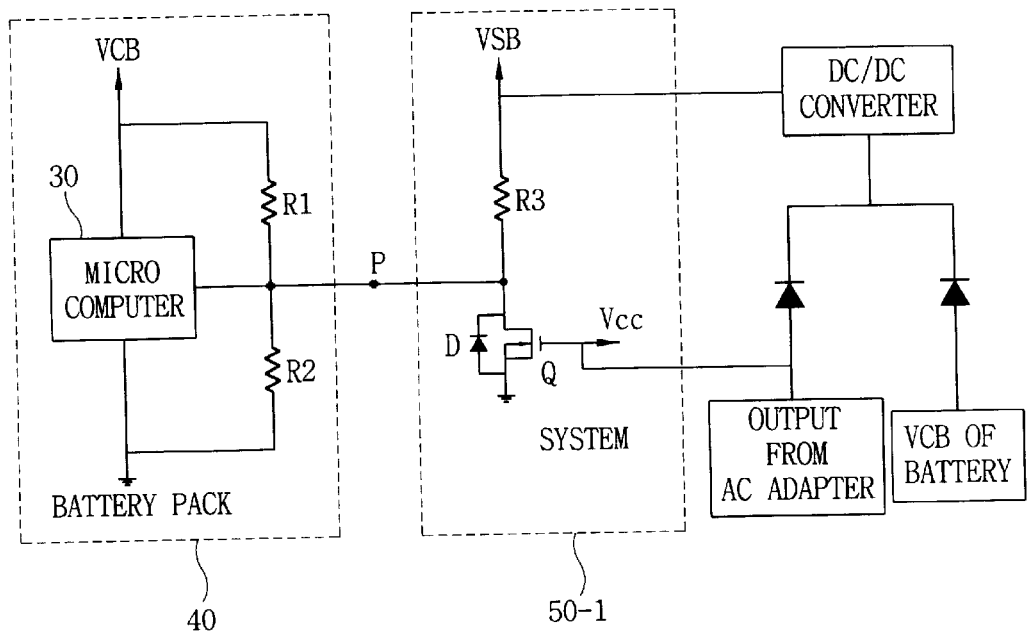
FIG. 2A illustrates an apparatus for detecting whether the battery pack is installed or connected to the system and whether AC power is connected to the system.

FIG. 2A illustrates an apparatus for detecting whether the battery pack 40 is installed or connected to the system 50-1 and whether AC power is connected to the system. The battery pack 40 includes a micro-controller 40, resistors R1 and R2. The resistors R1 and R2 are coupled between a voltage VCB of the battery and ground to serve as a voltage divider, and are coupled to the micro-controller 30 such that the micro-controller can detect a voltage level at a connection node P between the battery pack 40 and the system 50-1.

The system includes a resistor R3 coupled to a stand-by voltage VSB provided from the output of the DC/DC converter. The system further includes a diode D and a transistor Q coupled in parallel to each other and serially between the connection node P and ground. As shown therein, the transistor Q is activated by an output voltage Vcc of the AC adapter.

When the system uses the battery of the battery pack 40 and while the AC adapter is not connected to an external source, the DC/DC converter outputs a stand-by voltage VSB of approximately 3.3V based on the the voltage VCB of the battery. However, when the AC adapter is connected to an external source, the AC adapter outputs a voltage Vcc of approximately 16V, 19V or 24V, depending on the type of the AC adapter. In such a case, the stand-by voltage VSB provided from the DC/DC converter is approximately 5V.

When the AC adapter is not connected to a power source and the battery pack 40 is installed or connected to the system 50-1, the transistor Q is turned off. Further, a stand-by voltage VSB of approximately 3.3V is applied. In such a case, the connection node P exhibit a high voltage, which indicates to the micro-controller 30 that the AC adapter is not connected, but the battery pack 40 is installed or connected to the system.

When both the AC adapter is not connected to the power source and the battery pack 40 is not installed or connected, the connection node P is floating, which is classified as a medium level. Such a state indicates to the micro-controller 30 that the both the AC adapter and battery pack 40 are not connected.

When the AC adapter is connected, the transistor Q is turned on, and pulls the connection node P to ground or a low level. Such low level indicates to the micro-controller 30 that the AC adapter is connected.

Figure 2B:
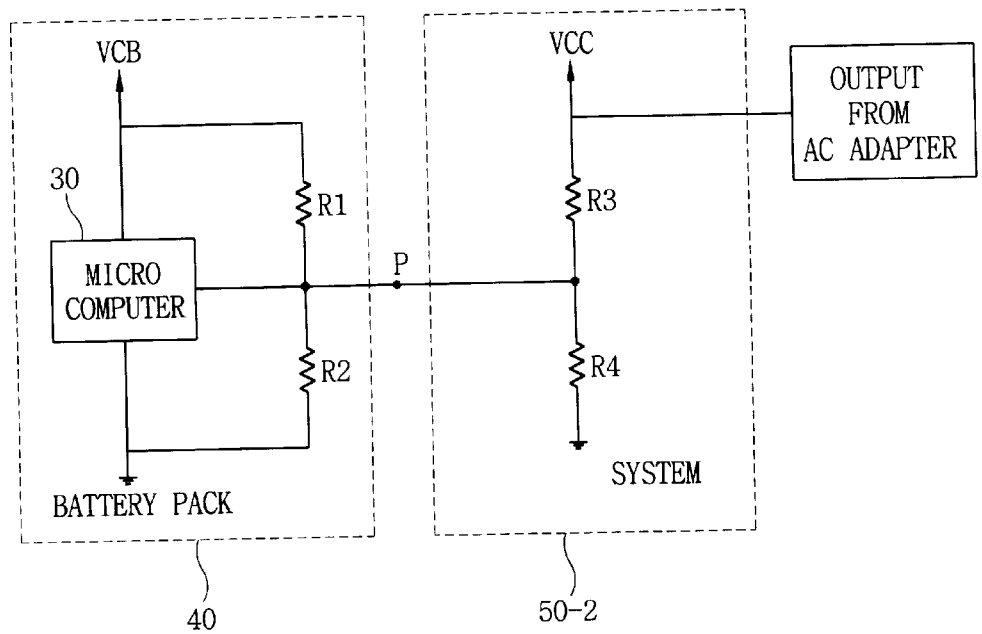
FIG. 2B is an alternative embodiment of FIG. 2A.

FIG. 2B is an alternative embodiment, which differs from FIG. 2A in that the transistor Q and the diode D are replaced with a resistor R4, and the resistor R3 is coupled to the output from the AC adapter. For the medium level, FIGS. 2A and 2B operates the same to indicate to the micro-controller 30 that both the battery pack 40 and the AC adapter are not connected. However, the connection node P changes to high level when the AC adapter is connected, which is detected by the micro-controller 30 of such a connection; and the connection node P changes to a low level when the battery pack 40 is connected, but not the AC adapter, which is detected by the micro-controller 30.

Figure 3A:
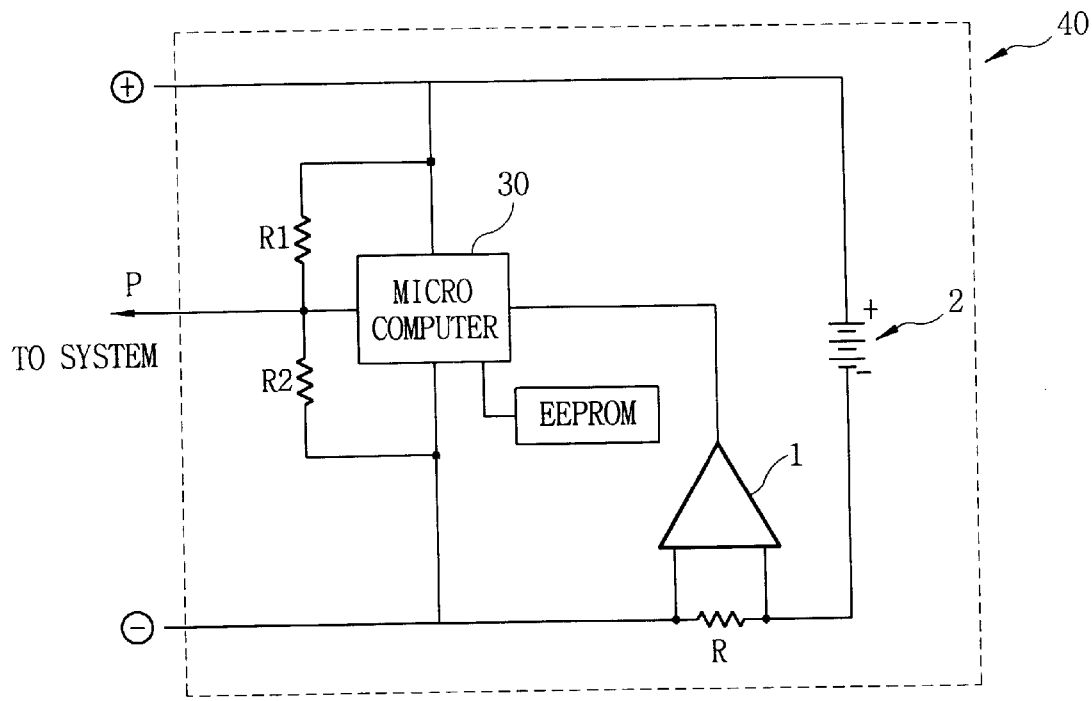
FIG. 3A illustrates a detailed schematic of the battery pack.
Figure 3B:
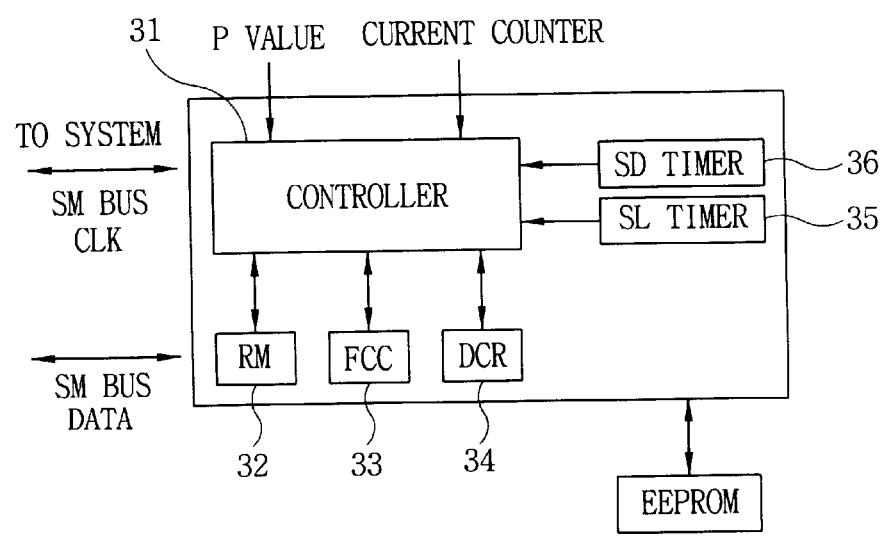
FIG. 3B illustrates the details of the micro-controller of FIG. 3A.

FIG. 3A illustrates a detailed schematic of the battery pack 40 having the micro-controller 30 coupled to an EEPROM, the current counter 1, the battery 2, and the resistors R1 and R2 for coupling to the connection node P. FIG. 3B illustrates the details of the micro-controller 30, which includes a controller 31 coupled to receive a voltage or P value of the connection node P and the output of the current counter 1. The micro-controller 30 further includes a remaining capacity register (RM) 32, the full charge capacity register (FCC) 33 and the discharge count register (DCR) 34. Moreover, the micro-controller includes a system leakage current timer 35 and a self-discharge timer 36.

The full charge capacity register 33 stores a value corresponding to a full capacity of the battery, which is obtained from the EEPROM. When the battery 2 is fully charged, value stored in the RM 32 equals the value stored in the FCC 33, and a value of 0 is stored in the DCR 34.

When the battery is discharging by use of the system with the battery 2 and without coupling to an external power source, the value stored in the RM decrements while the value stored in the DCR 34 increments, i.e., the value stored in the RM decreases from a first prescribed value to 0 and the value stored in the DCR 34 increases from 0 to a second prescribed value.

In other words, when the battery is charged, value of the remaining capacity register RM 32 increases in proportion to charge of the battery 2. However, when the battery is discharged, the discharge register counter DCR 34 counts from 0 to + direction, and the value of the remaining capacity register RM 32 decreases.

The system leakage (SL) current timer 35 generates a value reflective of the leakage current of the system when the system is turned off. Further, the self-discharge (SD) timer 36 generate a value reflective of the self-discharge when the system is using the battery as the power source without an external power source or when the battery pack is not connected. Such values from the SL current timer 35 and the SD timer 36 are used by the controller to decrease the value stored in the RM 32 and increase the value stored in the DCR 34.

Figure 4A:
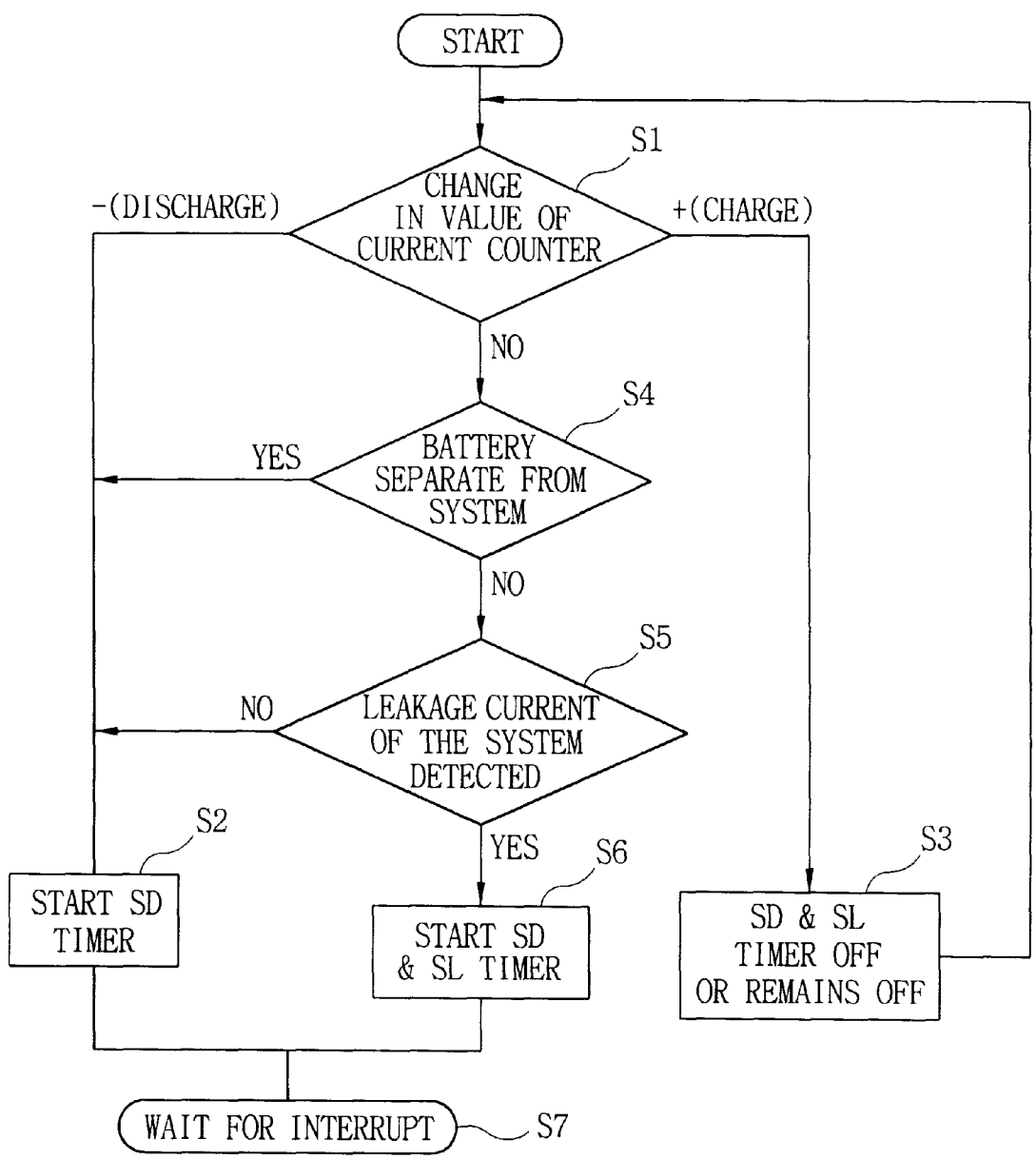
FIGS. 4A and 4B illustrate the method for compensating or accounting for the self-discharge and the leakage current.
Figure 4B:
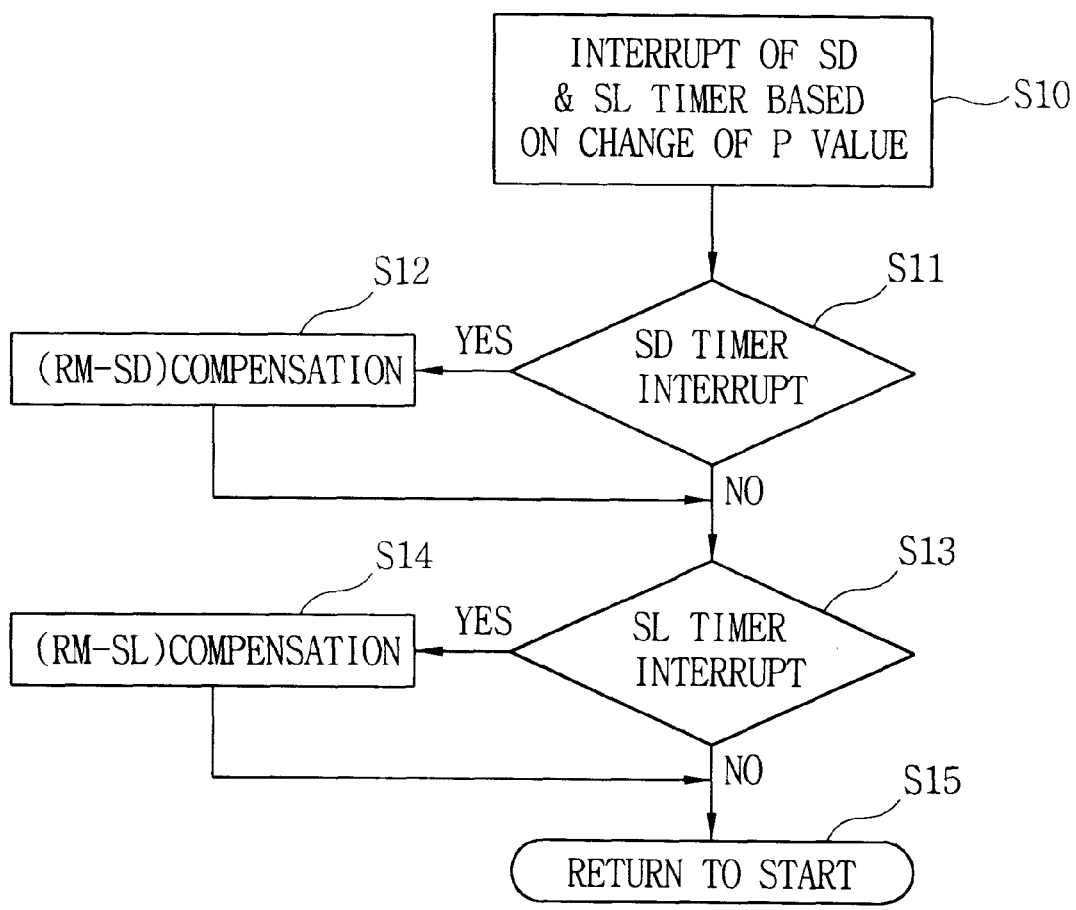

FIGS. 4A and 4B illustrate the method for compensating or accounting for the self-discharge and the leakage current. First, the micro-controller 30 detects a change in value of the current counter 1 of FIG. 3A (S1). If there is a discharge (−), e.g., the system is using the battery for power, the SD timer 36 is started to reflect the self-discharge of battery (S2). However, when the system is connected to an external power source via the AC adapter, the battery is being charged (+), the SL timer 35 and the SD timer 36 are off or remain off (S3).

When there is no change in value of the current counter 1, the micro-controller 30 checks to determine whether the battery pack 40 is disconnected or not installed in the system 50-1 base on the value at the connection node P of FIG. 2A or FIG. 2B (S4). If the battery pack 40 is separated from the system, the SD timer 36 is started to reflect the self-discharge of the battery (S2). However, if the battery pack 40 is connected to the system 50-1, the micro-controller 30 checks to determine if there is leakage current using the detector of FIGS. 2A and 2B (S5). If there is no leakage current, the SD timer 36 is started to reflect the self-discharge of the battery (S2). However, if there is leakage current, both the SL timer 35 and the SD timer 36 are started to reflect the self-discharge of the battery and the leak current (S6). After step S2 or S6, the SL timer 35 and/or SD timer 35 waits for an interrupt to be generated (S7).

As shown in FIG. 4B, the controller 31 generates an interrupt of the SL timer 35 and the SD timer 36 based on the change of the P value (S11). Thereafter, if there is an SD timer interrupt (S11), the value of the RM register 32 is compensated or adjusted to reflect the self discharge (S12). If there is an SL timer interrupt (S13), the value of the RM register 32 is compensated or adjusted to reflect the leakage current. Thereafter, the method returns to the start to repeat the process (S15).

The present invention has various advantages. For example, the present invention compensates for the self discharge. Further, the present invention compensates for the leakage current. Such compensations allow accurate reflections of the battery status, and allow a user to correct manage the remaining charge of the battery.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, the present invention is not limited to a notebook computer, but is readily applicable to all systems using a battery as an alternate power source, including cameras, camcorders, audio players, radios, cell phones, etc.

What is claimed is:

1. A battery pack comprising:
   a battery;
   a micro-computer which compensates for leakage current and self-discharge of the battery; and
   a current counter that indicates discharge or charge of the battery.

2. The battery pack of claim 1, further comprising first and second resistors coupled in series at a first node and coupled in parallel with the micro-computer, said micro-computer and the first node being coupled to a system.

3. The battery pack of claim 2, wherein a first value at the first node indicates that the battery is connected to the system and the system is not coupled to an external power source, a second value at the first node indicates that the battery is not connected to the system and the system is not coupled to the external power source, and a third value at the first node indicates that the system is coupled to the external power source regardless of battery connection to the system.

4. The battery pack of claim 2, wherein the system performs a prescribed function and operation to achieve a prescribed result, the system having a device, which includes:
   a resistor coupled for receiving a stand-by voltage;
   a transistor coupled to the resistor for receiving an output of an adapter; and
   a diode coupled to the transistor in parallel, wherein a voltage at a node connection, which corresponds to the first node, between the transistor and resistor is indicative of at least one of application of stand-by voltage and output of the adapter.

5. The battery pack of claim 2, wherein system performs a prescribed function and operation to achieve a prescribed result, the system having a device, which includes:
- a first resistor coupled for receiving an output of an adapter; and
- a second resistor coupled to the first resistor in series, wherein a voltage of a serial connection node, which corresponds to the first node, is indicative of a connection to the adapter.

6. The battery pack of claim 1, wherein the microcomputer comprises:
- a controller receiving a signal indicative of a status of the battery pack and an output of the current counter;
- a first register indicative of the remaining charge of the battery;
- a second register indicative of the full charge of the battery; and
- a third register indicative of the discharge of the battery.

7. The battery pack of claim 6, wherein said microcomputer comprises:
- a self-discharge timer outputting a value indicative of a self-discharge of the battery to the controller; and
- a leakage current timer outputting a value indicative of a leakage current.

8. The battery pack of claim 7, wherein the value indicative of the self-discharge of the battery outputted by the self-discharge timer is used to decrement and increment values, respectively, stored in the first and third registers.

9. The battery pack of claim 7, wherein the value indicative of the leakage current outputted by the leakage current timer is used to decrement and increment values, respectively, stored in the first and third registers.

10. The battery pack of claim 7, wherein the self-discharge timer is activated when the current counter indicates discharge of the battery.

11. The battery pack of claim 7, wherein the self-discharge timer and the leakage current timer remain off or are deactivated when the current counter indicates charging of the battery.

12. The battery pack of claim 7, wherein the self-discharge timer is activated when the current counter indicates neither discharge nor charging of the battery and the status received by the controller indicates disconnection of the battery from a system.

13. The battery pack of claim 7, wherein the self-discharge timer is activated when the current counter indicates neither discharge nor charging of the battery, the status received by the controller indicates connection of the battery from a system, and no leakage current of the system is detected.

14. The battery pack of claim 7, wherein the self-discharge timer and the leakage current timer are activated when the current counter indicates neither discharge nor charging of the battery, the status received by the controller indicates connection of the battery from a system, and leakage current of the system is detected.

15. The battery pack of claim 5, wherein first and second values stored in the first and second registers, respectively, are same and a third value stored in the third register is less than first and second values when the battery is fully charged.

16. The battery pack of claim 6, wherein the current counter outputs a value indicative of discharge of the battery, the first register decrements from a first prescribed value to a second prescribed value and the third register increments from the second prescribed value to the first prescribed value.

17. The battery pack of claim 1, further comprising a memory device storing a first value indicative of a fully charged status of the battery.

18. A method for operating a battery pack having a battery for coupling to a system, comprising:
- detecting a change in the charge of the battery;
- determining a self-discharge of the battery;
- determining a leakage current of the battery; and
- compensating for at least one the change in the charge of the battery, self-discharge of the battery, and the leakage current.

* * * * *